United States Patent
Sun et al.

(10) Patent No.: US 11,411,698 B2
(45) Date of Patent: Aug. 9, 2022

(54) DEMODULATION REFERENCE SIGNAL TRANSMISSION METHOD, NETWORK DEVICE AND USER EQUIPMENT

(71) Applicant: VIVO MOBILE COMMUNICATION CO., LTD., Guangdong (CN)

(72) Inventors: Xiaodong Sun, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 196 days.

(21) Appl. No.: 16/753,265

(22) PCT Filed: Sep. 20, 2018

(86) PCT No.: PCT/CN2018/106603
§ 371 (c)(1),
(2) Date: Apr. 2, 2020

(87) PCT Pub. No.: WO2019/072077
PCT Pub. Date: Apr. 18, 2019

(65) Prior Publication Data
US 2020/0274670 A1    Aug. 27, 2020

(30) Foreign Application Priority Data
Oct. 11, 2017    (CN) .......................... 201710943727.7

(51) Int. Cl.
*H04L 5/00* (2006.01)
*H04W 72/04* (2009.01)

(52) U.S. Cl.
CPC ....... *H04L 5/0048* (2013.01); *H04W 72/0406* (2013.01); *H04W 72/0446* (2013.01)

(58) Field of Classification Search
CPC ............ H04L 5/0048; H04W 72/0406; H04W 72/0446
See application file for complete search history.

(56) References Cited

U.S. PATENT DOCUMENTS

| 2012/0002746 A1 | 1/2012 | Pham |
| 2013/0114756 A1 | 5/2013 | Jia et al. |
| 2017/0223695 A1* | 8/2017 | Kwak .............. H04W 56/0005 |

FOREIGN PATENT DOCUMENTS

| CN | 102356574 A | 2/2012 |
| CN | 102404854 A | 4/2012 |

(Continued)

OTHER PUBLICATIONS

European Search Report in Application No. 18867230.7 dated Oct. 27, 2020.
(Continued)

*Primary Examiner* — Christopher M Crutchfield
*Assistant Examiner* — Alan L Lindenbaum
(74) *Attorney, Agent, or Firm* — Maschoff Brennan

(57) ABSTRACT

A DMRS transmission method, a network device and a UE are provided. The DMRS transmission method includes: configuring DMRS of a service channel within a mini-slot; mapping parts of or all of the DMRS of the service channel to a time-domain transmission resource, the time-domain transmission resource being offset by M time-domain symbols relative to a time-domain transmission resource corresponding to a control channel within the mini-slot, M being an integer greater than or equal to 1; and transmitting the DMRS of the service channel through the time-domain transmission resource.

19 Claims, 8 Drawing Sheets

(56) References Cited

FOREIGN PATENT DOCUMENTS

CN          103095637 A    5/2013
EP          3 664 555 A1   6/2020

OTHER PUBLICATIONS

"On mulitplexing of different types of RSs" 3GPP TSG RAN WG1 NR Ad Hoc #3, Sep. 18, 2107.
"Remaining details on DMRS design" 3GPP TSG RAN WG1 Meeting #90bis, Oct. 9, 2017.
"Remaining details for DMRS design" 3GPP TSG RAN WG1 Meeting 90bis, Oct. 9, 2017.
Written Opinion and International Search Report in Application No. PCT/CN2018/106603 dated Apr. 23, 2020.

* cited by examiner

DEMODULATION REFERENCE SIGNAL TRANSMISSION METHOD, NETWORK DEVICE AND USER EQUIPMENT

CROSS-REFERENCE TO RELATED APPLICATION

The present application is the U.S. national phase of PCT Application No. PCT/CN2018/106603 filed on Sep. 20, 2018, which claims a priority of the Chinese patent application No. 201710943727.7 filed on Oct. 11, 2017, which is incorporated herein by reference in its entirety.

TECHNICAL FIELD

The present disclosure relates to the field of communication technology, in particular to a Demodulation Reference Signal (DMRS) transmission method, a network device and a User Equipment (UE).

BACKGROUND

In a $4^{th}$-Generation (4G) mobile communication system, a DMRS is mainly used for channel estimation and demodulation of a service channel, a control channel and a broadcast channel, and a DMRS pattern is located at a fixed position in a time domain and a frequency domain. Especially, in order to maintain backward compatibility, the DMRS of the service channel within a normal Transmission Time Interval (TTI) is multiplexed for a short TTI.

In a coming $5^{th}$-Generation (5G) mobile communication system (also called as New Radio (NR) system), in order to support various services such as an enhanced Mobile Broadband (eMBB) service and an Ultra Reliable & Low Latency Communication (URLLC) service, a front-loaded DMRS has been introduced. The front-loaded DMRS includes two configurable patterns, and its main purpose is to achieve the demodulation as soon as possible. In addition, in order to be adapted to various application scenarios, an additional DMRS has been defined. The quantity of ports for the additional DMRS may be different from the quantity of ports for the front-loaded DMRS. A time-domain density of the additional DMRS may be dynamically configured based on the requirements in each scenario, e.g., as compared with a low-speed moving scenario, the time-domain density of the additional DMRS may increase in a high-speed moving scenario.

Further, In the NR system, within one slot, a position of a front-loaded DMRS is fixed and independent of a position of a first time-domain symbol (Orthogonal Frequency Division Multiplexing (OFDM) symbol) occupied by a Physical Downlink Shared Channel (PDSCH). There are two configuration types for the front-loaded DMRS, i.e., a configuration type 1 (one symbol, Comb2+Cyclic Shift 2 (CS2), which supports at most four antenna ports; or two symbols, Comb2+CS2+Time Division (TD) Orthogonal Cover Code (OCC), which supports at most eight antenna ports) and a configuration type 2 (one symbol, 2-Frequency Division (FD)-OCC (consecutive Resource Elements (REs) in a frequency domain), which supports at most six antenna ports; or two symbols, 2-FD-OCC (consecutive REs in a frequency domain)+TD-OCC, which supports at most twelve antenna ports).

FIG. 1 shows the DMRS pattern of the configuration type 1. A DMRS mapped to one OFDM symbol may support at most four antenna ports. One OFDM symbol may include two groups of comb resources Comb, and each group of comb resources may correspond to one antenna port. Each group of comb resources may carry two groups of cyclically-shifted sequence codes, and one group of sequence codes may correspond to one antenna port. Hence, the DMRS mapped to one OFDM symbol may support at most four antenna ports, and the DMRS mapped to two OFDM symbols may support at most eight antenna ports.

FIG. 2 shows the DMRS pattern of the configuration type 2. The DMRS mapped to one OFDM symbol may support at most six antenna ports. At most three groups of DMRS patterns with consecutive REs may be mapped to one OFDM symbol, and each group of DMRS patterns may correspond to one antenna port. Each group of DMRS patterns may carry two groups of orthogonal codes, and each group of orthogonal codes may correspond to one antenna port. Hence, the DMRS mapped to one OFDM symbol may support at most six antenna ports, and the DMRS mapped to two OFDM symbols may support at most twelve antenna ports.

Further, a position of a first DMRS of the PDSCH may be fixed on third and/or fourth OFDM symbols within a normal slot, or on a first OFDM symbol for scheduling data within a non-normal slot. When both the normal slot and the non-normal slot have been configured by a network device for a UE, the position of the first DMRS may be switched between the third and/or fourth OFDM symbols and the first symbol for scheduling the data.

The design of the front-loaded DMRS in a normal slot scenario in the coming NR system has been given hereinabove. However, in the NR system, there is also a scenario where a time length of a time-domain transmission unit is smaller than the normal slot, e.g., a mini-slot scenario. In the related art, there is currently no DMRS configuration and transmission method in the mini-slot scenario.

SUMMARY

In one aspect, the present disclosure provides in some embodiments a DMRS transmission method for a network device, including: configuring DMRS of a service channel within a mini-slot; mapping parts of or all of the DMRS of the service channel to a time-domain transmission resource, the time-domain transmission resource being offset by M time-domain symbols relative to a time-domain transmission resource corresponding to a control channel within the mini-slot, M being an integer greater than or equal to 1; and transmitting the DMRS of the service channel through the time-domain transmission resource.

In another aspect, the present disclosure provides in some embodiments a network device, including: a configuration module configured to configure DMRS of a service channel within a mini-slot; a mapping module configured to map parts of or all of the DMRS of the service channel to a time-domain transmission resource, the time-domain transmission resource being offset by M time-domain symbols relative to a time-domain transmission resource corresponding to a control channel within the mini-slot, M being an integer greater than or equal to 1; and a transmission module configured to transmit the DMRS of the service channel through the time-domain transmission resource.

In yet another aspect, the present disclosure provides in some embodiments a network device, including a processor, a memory, and a computer program stored in the memory and executed by the processor. The processor is configured to execute the computer program so as to implement the above-mentioned DMRS transmission method.

In still yet another aspect, the present disclosure provides in some embodiments a computer-readable storage medium storing therein a computer program. The computer program is executed by a processor so as to implement the above-mentioned DMRS transmission method.

In still yet another aspect, the present disclosure provides in some embodiments a DMRS transmission method for a UE, including: determining a time-domain transmission resource for a control channel within a mini-slot; and detecting a time-domain transmission resource offset by M time-domain symbols relative to the time-domain transmission resource so as to acquire parts of or all of DMRS of a service channel within the mini-slot, M being an integer greater than or equal to 1.

In still yet another aspect, the present disclosure provides in some embodiments a UE, including: a determination module configured to determine a time-domain transmission resource for a control channel within a mini-slot; and a detection module configured to detect a time-domain transmission resource, the time-domain transmission resource being offset by M time-domain symbols relative to the time-domain transmission resource so as to acquire parts of or all of DMRS of a service channel within the mini-slot, M being an integer greater than or equal to 1.

In still yet another aspect, the present disclosure provides in some embodiments a UE, including a processor, a memory, and a computer program stored in the memory and executed by the processor. The processor is configured to execute the computer program so as to implement the above-mentioned DMRS transmission method.

In still yet another aspect, the present disclosure provides in some embodiments a computer-readable storage medium storing therein a computer program. The computer program is executed by a processor so as to implement the above-mentioned DMRS transmission method.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
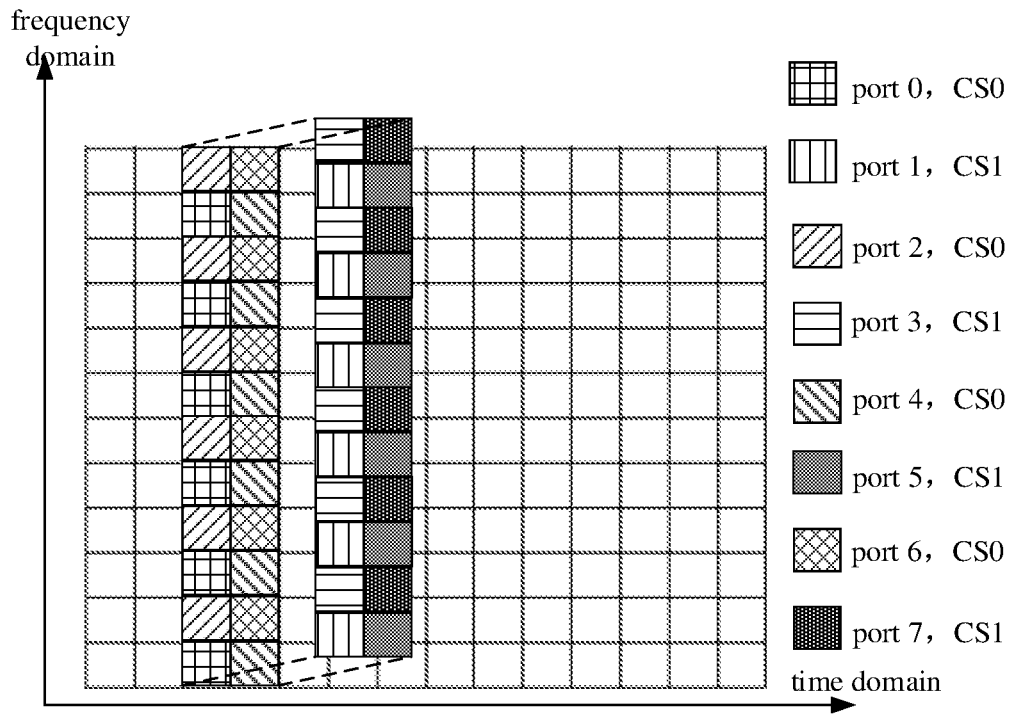
FIG. 1 is a schematic view showing a DMRS pattern of a configuration type 1 according to one embodiment of the present disclosure.
Figure 2:
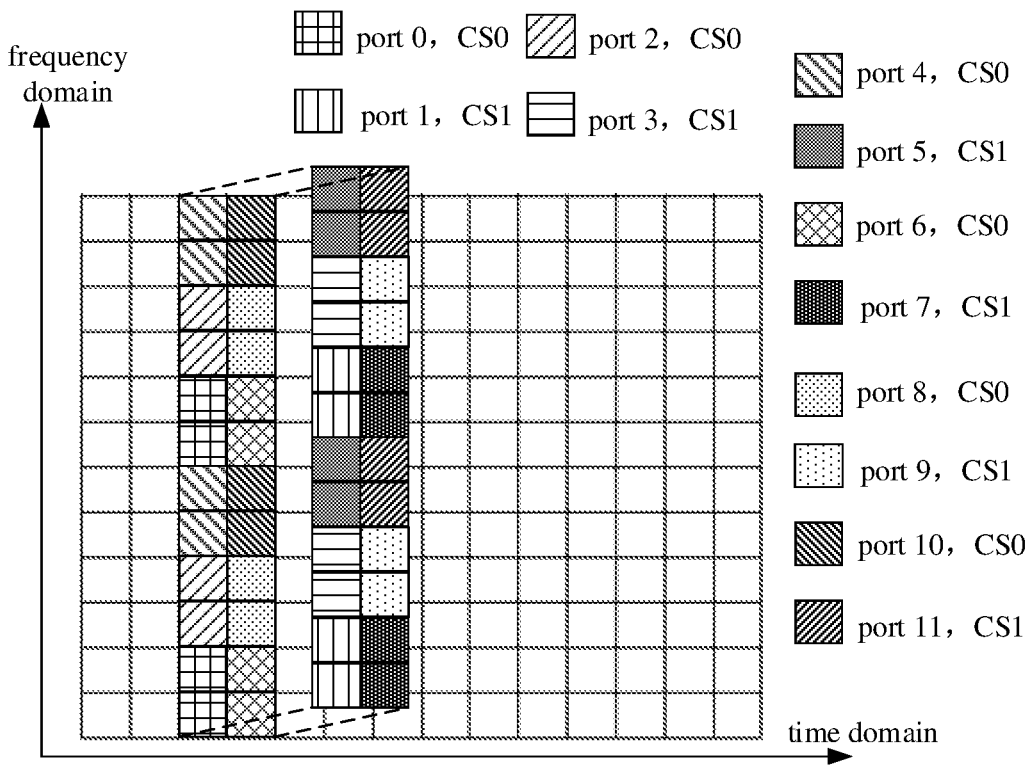
FIG. 2 is a schematic view showing the DMRS pattern of a configuration type 2 according to one embodiment of the present disclosure.

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C.

Figure 3:
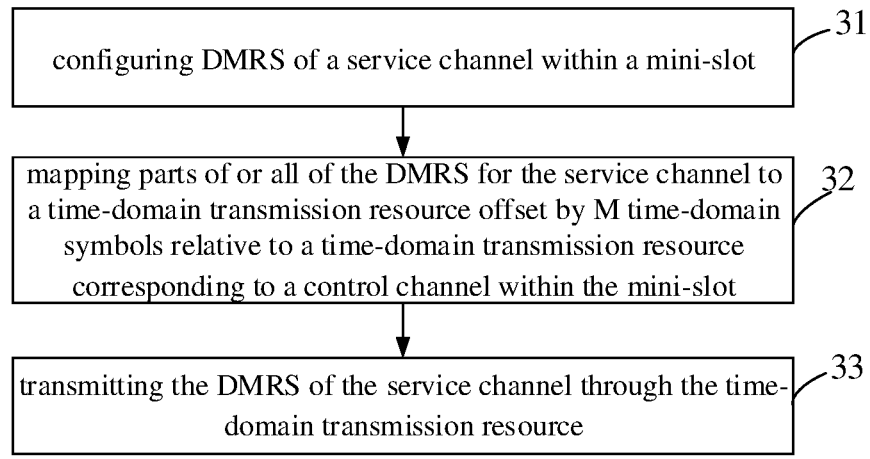
FIG. 3 is a flow chart of a DMRS transmission method applied for a network device according to one embodiment of the present disclosure.

The present disclosure provides in some embodiments a DMRS transmission method applied for a network device which, as shown in FIG. 3, includes the following steps.

Step 31: configuring DMRS of a service channel within a mini-slot.

In an NR system, a normal slot (also called as slot) has a length of 7 or 14 time-domain symbols (or OFDM symbols). A slot having a length smaller than the normal slot may be called as short slot or mini-slot. In a mini-slot transmission scenario, a control channel and a service channel may occur on one or more time-domain symbols concurrently, and at this time, the network device needs to configure the DMRS of the control channel and the service channel respectively.

It should be appreciated that, the DMRS may be one of a front-loaded DMRS and an additional DMRS.

Step 32: mapping parts of or all of the DMRS of the service channel to a time-domain transmission resource offset by M time-domain symbols relative to a time-domain transmission resource corresponding to a control channel within the mini-slot.

M may be an integer greater than or equal to 1. Here, the time-domain transmission resource to which parts of or all of the DMRS of the service channel are mapped by the network device may be located on a resource offset by M time-domain transmission symbols relative to the time-domain transmission resource occupied by the control channel. The service channel may include a Physical Uplink Shared Channel (PUSCH) or a Physical Downlink Shared Channel (PDSCH). The control channel may include a Physical Uplink Control Channel (PUCCH) or a Physical Downlink Control Channel (PDCCH). In other words, the network device may map parts of or all of the DMRS of the PUSCH to a resource offset by M OFDM symbols relative to a transmission resource for the PUCCH, and map parts of or all of the DMRS of the PDSCH to a resource offset by M OFDM symbols relative to a transmission resource for the PDCCH, so as to prevent the occurrence of interference between the DMRS of the control channel and the service channel, and rapidly demodulate the service channel.

Step 33: transmitting the DMRS of the service channel through the time-domain transmission resource.

The network device may map parts of or all of the DMRS of the service channel to the transmission resource offset by M OFDM symbols relative to the transmission resource for the control channel, and transmit them to a UE, so that the UE may demodulate the service channel in accordance with the corresponding DMRS.

A configuration procedure of the network device will be described hereinafter in conjunction with the drawings and the specific application scenarios.

Scenario 1: in a mini-slot transmission scenario, all the DMRS of the service channel may be mapped to the time-domain resource offset by M time-domain symbols relative to the time-domain transmission resource corresponding to the control channel and then transmitted.

Figure 4:
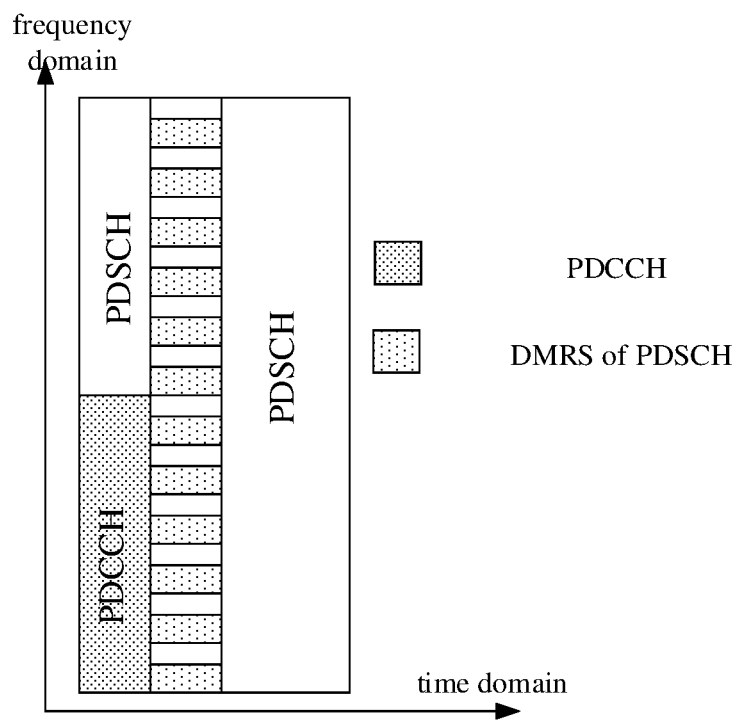
FIG. 4 is a schematic view showing the mapping of downlink resources in scenario 1 according to one embodiment of the present disclosure.
Figure 5:
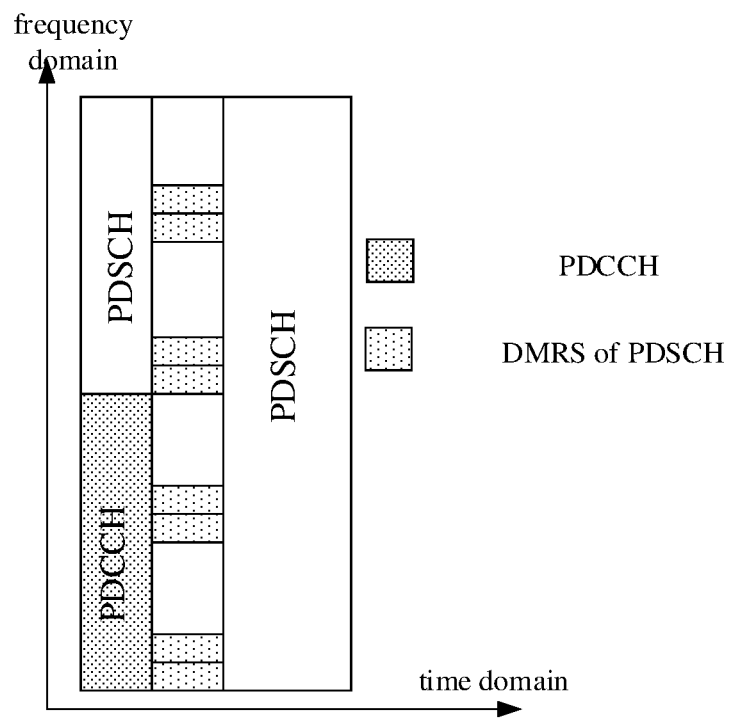
FIG. 5 is another schematic view showing the mapping of the downlink resources in scenario 1 according to one embodiment of the present disclosure.

To be specific, as shown in FIGS. 4 and 5, it is presumed that four time-domain symbols are occupied by a downlink mini-slot, a part of resources for a first time-domain symbol (e.g., a low-frequency portion in FIGS. 4 and 5) are occupied by the control channel, and the other resources are occupied by the service channel. The network device may map all the DMRS of the service channel to the time-domain symbol offset backward by one time-domain symbol relative to the time-domain symbol where the control channel is located. The DMRS pattern of the service channel may be mapped using the configuration type 1 as shown in FIG. 4, or the configuration type 2 as shown in FIG. 5.

Figure 6:
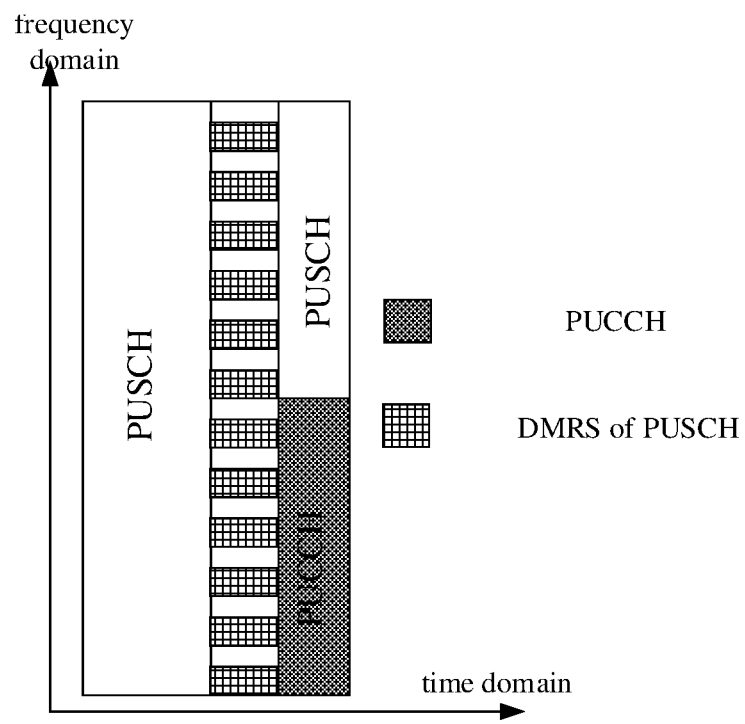
FIG. 6 is a schematic view showing the mapping of uplink resources in scenario 1 according to one embodiment of the present disclosure.
Figure 7:
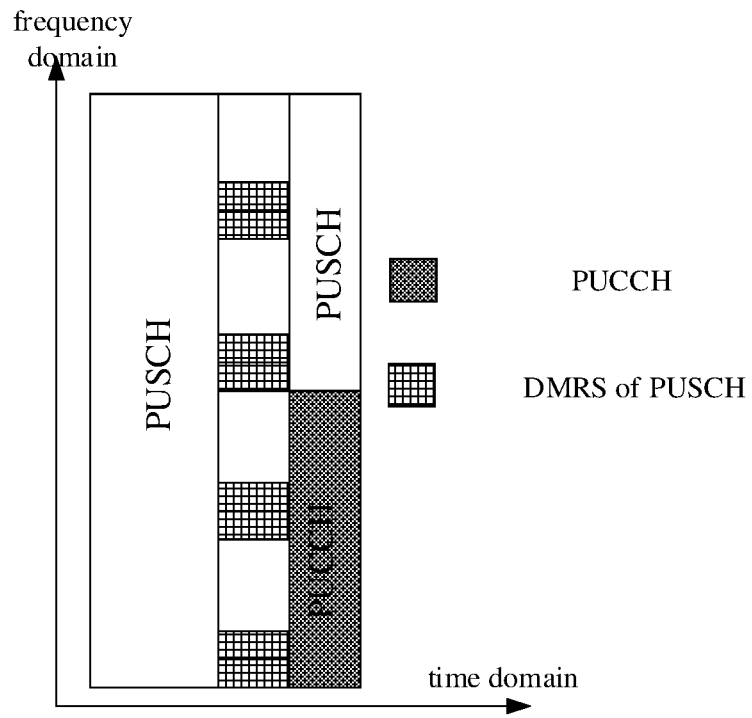
FIG. 7 is another schematic view showing the mapping of the uplink resources in scenario 1 according to one embodiment of the present disclosure.

Alternatively, as shown in FIGS. 6 and 7, it is presumed that four time-domain symbols are occupied by an uplink mini-slot, a part of resources for a fourth time-domain symbol (e.g., a low-frequency portion in FIGS. 6 and 7) are occupied by the control channel, and the other resources are occupied by the service channel. The network device may map all the DMRS of the service channel to the time-domain symbol offset forward by one time-domain symbol relative to the time-domain symbol where the control channel is located. The DMRS pattern of the service channel may be mapped using the configuration type 1 as shown in FIG. 6, or the configuration type 2 as shown in FIG. 7.

Scenario 2: in the mini-slot transmission scenario, parts of the DMRS of the service channel may be mapped to the time-domain resource offset by M time-domain symbols relative to the time-domain transmission resource corresponding to the control channel and then transmitted.

To be specific, Step 32 may include mapping a first part of DMRS of the service channel to the time-domain transmission resource offset by M time-domain symbols relative to the time-domain transmission resource corresponding to the control channel within the mini-slot. The first part of the DMRS may be DMRS in the DMRS of the service channel overlapping frequency-domain transmission resources corresponding to the control channel, i.e., frequency-domain positions of frequency-domain transmission resources corresponding to the first part of DMRS may overlap those of the frequency-domain transmission resources corresponding to the control channel In this regard, a part of the DMRS of the service channel overlapping the frequency-domain transmission resources corresponding to the control channel are offset backward by M time-domain symbols, so as to prevent the interference between the DMRS of the service channel and the control channel, thereby to improve a downlink data transmission rate.

Figure 8:
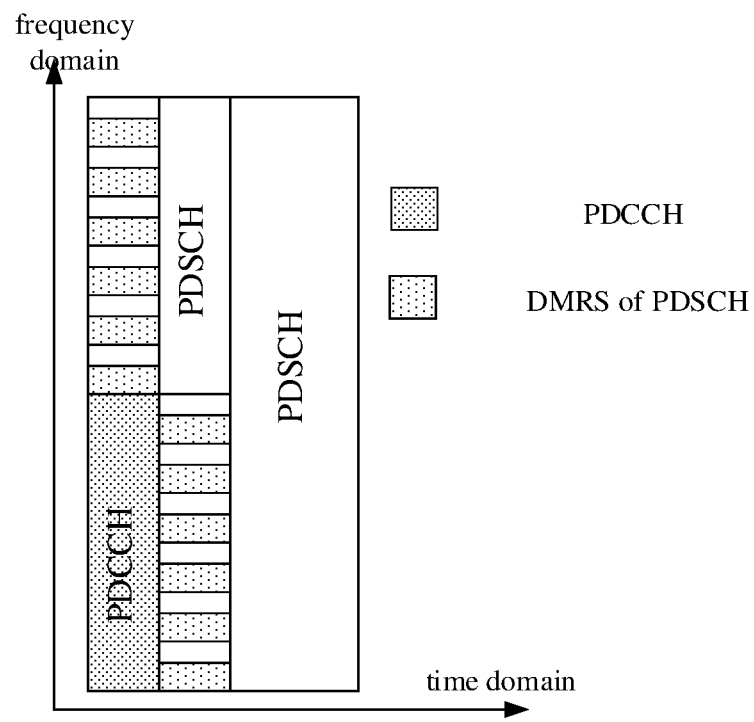
FIG. 8 is a schematic view showing the mapping of the downlink resources in scenario 2 according to one embodiment of the present disclosure.
Figure 9:
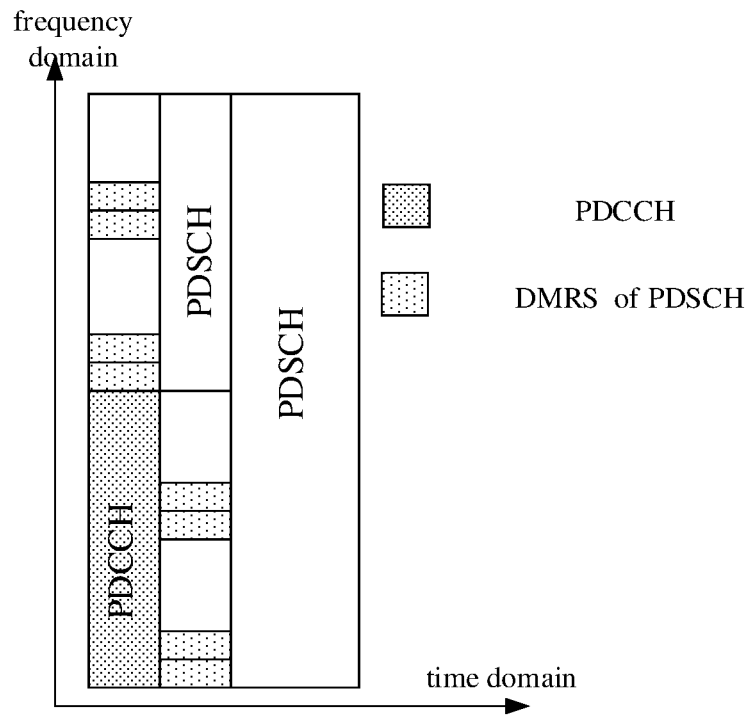
FIG. 9 is another schematic view showing the mapping of the downlink resources in scenario 2 according to one embodiment of the present disclosure.

As shown in FIGS. 8 and 9, it is presumed that four time-domain symbols are occupied by the downlink mini-slot, a part of resources for a first time-domain symbol (e.g., a low-frequency portion in FIGS. 8 and 9) are occupied by the control channel, and the other resources are occupied by the service channel. The network device may map the first part of the DMRS of the service channel (i.e., those overlapping the frequency-domain resources for the control channel) to the time-domain symbol offset backward by one time-domain symbol relative to the time-domain symbol where the control channel is located. The DMRS pattern of the service channel may be mapped using the configuration type 1 as shown in FIG. 8, or the configuration type 2 as shown in FIG. 9.

Figure 10:
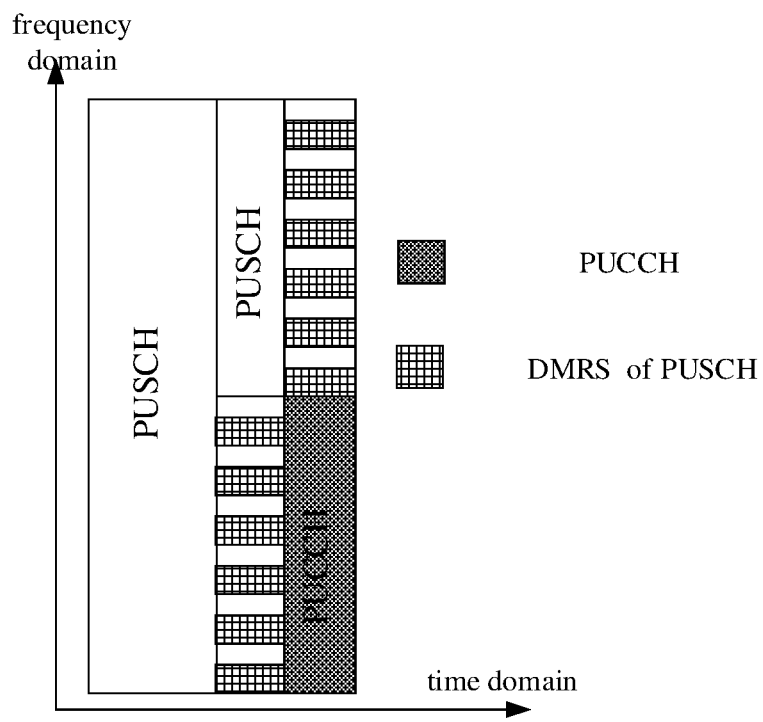
FIG. 10 is a schematic view showing the mapping of the uplink resources in scenario 2 according to one embodiment of the present disclosure.
Figure 11:
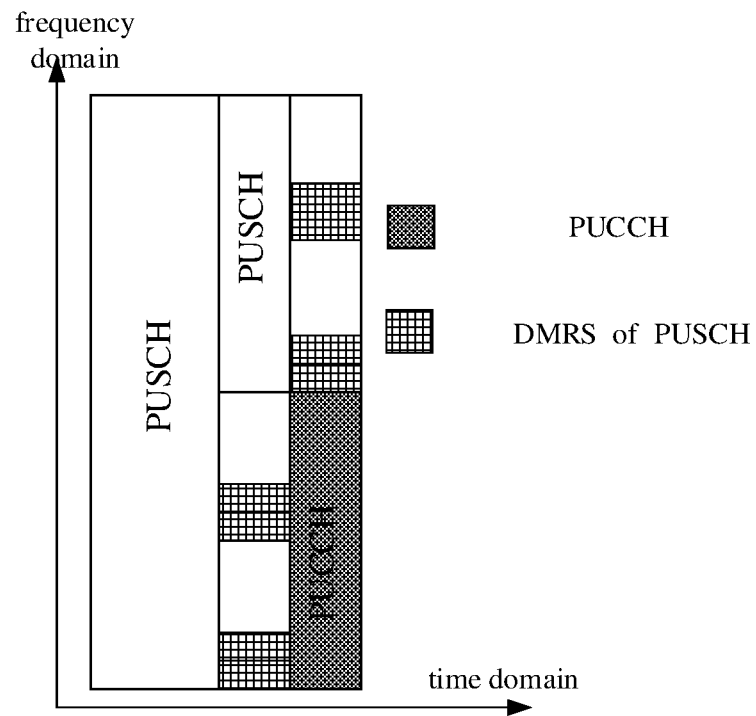
FIG. 11 is another schematic view showing the mapping of the uplink resources in scenario 2 according to one embodiment of the present disclosure.

Alternatively, as shown in FIGS. 10 and 11, it is presumed that four time-domain symbols are occupied by the uplink mini-slot, a part of resources for a fourth time-domain symbol (e.g., a low-frequency portion in FIGS. 10 and 11) are occupied by the control channel, and the other resources are occupied by the service channel. The network device may map the first part of the DMRS of the service channel (i.e., those overlapping the frequency-domain transmission resource for the control channel) to the time-domain symbol offset forward by one time-domain symbol relative to the time-domain symbol where the control channel is located. The DMRS pattern of the service channel may be mapped using the configuration type 1 as shown in FIG. 10, or the configuration type 2 as shown in FIG. 11.

In the scenario where a part of the DMRS of the service channel are mapped to the time-domain symbol offset by M time-domain symbols, the DMRS transmission method may further include mapping a second part of DMRS of the service channel to transmission resources in the time-domain transmission resources corresponding to the control channel within the mini-slot and at frequency-domain positions different from the control channel. The second part of DMRS may be DMRS in the DMRS of the service channel not overlapping the frequency-domain transmission resources corresponding to the control channel, i.e., frequency-domain positions of frequency-domain transmission resources corresponding to the second part of DMRS may not overlap the frequency-domain positions of the frequency-domain transmission resources corresponding to the control channel.

To be specific, as shown in FIGS. 8 and 9, it is presumed that four time-domain symbols are occupied by the downlink mini-slot, a part of resources for a first time-domain symbol (e.g., a low-frequency portion in FIGS. 8 and 9) are occupied by the control channel, and the other resources are occupied by the service channel. The network device may map the second part of the DMRS of the service channel (i.e., those not overlapping the frequency-domain resources for the control channel) to the transmission resources in the time-domain symbol where the control channel is located and different from the frequency-domain resource corresponding to the control channel (e.g., a high-frequency portion in FIGS. 8 and 9). The DMRS pattern of the service channel may be mapped using the configuration type 1 as shown in FIG. 8, or the configuration type 2 as shown in FIG. 9.

Alternatively, as shown in FIGS. 10 and 11, it is presumed that four time-domain symbols are occupied by the uplink mini-slot, a part of resources for a fourth time-domain symbol (e.g., a low-frequency portion in FIGS. 10 and 11) are occupied by the control channel, and the other resources are occupied by the service channel. The network device may map the second part of the DMRS of the service channel (i.e., those not overlapping the frequency-domain resources for the control channel) to the transmission resources in the time-domain symbol where the control channel is located and different from the frequency-domain resource corresponding to the control channel (e.g., a high-frequency portion in FIGS. 10 and 11). The DMRS pattern of the service channel may be mapped using the configuration type 1 as shown in FIG. 10, or the configuration type 2 as shown in FIG. 11.

Further, Step 31 may include: configuring predetermined parameters of each DMRS of the service channel within the mini-slot; and transmitting the predetermined parameters of each DMRS of the service channel to the UE. The predetermined parameters may include at least one of configuration type information, frequency-domain density information, time-domain position information, and port information.

To be specific, the configuration type information of each DMRS may be used to indicate whether the DMRS pattern is of the configuration type 1 or the configuration type 2. The network device may transmit the configuration type information carried in a broadcast channel or Radio Resource Control (RRC) signaling to the UE. The frequency-domain density information of each DMRS may be used to indicate a frequency-domain density of the DMRS, i.e., a frequency-domain distribution of the DMRS, and it mainly functions as to reduce the overhead for the DMRS. The network device may transmit the frequency-domain density information carried in the RRC signaling to the UE. The time-domain position information of each DMRS may be used to indicate a position of a time-domain symbol occupied by the DMRS. The network device may transmit the time-domain position information carried in the RRC signaling to the UE. The port information may be used to indicate a port or a port set occupied by the DMRS. The network device may transmit the port information carried in Downlink Control Information (DCI) to the UE.

Further, when various DMRS mapping modes are supported by a system, e.g., both the mapping mode in Scenario 1 and the mapping mode in Scenario 2, the network device shall notify the UE of the DMRS mapping mode to be adopted.

To be specific, subsequent to Step 31, the DMRS transmission method may further include: acquiring a mapping mode of the DMRS of the service channel; and determining whether to transmit indication information indicating the mapping mode to the UE in accordance with the mapping mode. When the indication information is to be transmitted to the UE, the network device may transmit the indication information indicating the mapping mode to the UE through the DCI or high-layer signaling. The indication information may be used to indicate one of mapping parts of the DMRS of the service channel to the time-domain transmission resource offset by M time-domain symbols relative to the time-domain transmission resource corresponding to the control channel within the mini-slot, and mapping all of the DMRS of the service channel to the time-domain transmission resource offset by M time-domain symbols relative to the time-domain transmission resource corresponding to the control channel within the mini-slot.

To be specific, the system may set a default mapping mode and/or a non-default mapping mode. The non-default mapping mode may include one of mapping parts of the DMRS of the service channel to the time-domain transmission resource offset by M time-domain symbols relative to the time-domain transmission resource corresponding to the control channel within the mini-slot and mapping all of the DMRS of the service channel to the time-domain transmission resource offset by M time-domain symbols relative to the time-domain transmission resource corresponding to the control channel within the mini-slot, and the default mapping mode may include the other one. To be specific, the determining whether to transmit the indication information indicating the mapping mode to the UE in accordance with the mapping mode may include: when the mapping mode is the default mapping mode, not transmitting the indication information indicating the mapping mode to the UE; and when the mapping mode is the non-default mapping mode, transmitting the indication information indicating the mapping mode to the UE through the DCI or the high-layer signaling. For example, when the mapping mode in Scenario 1 is set as the default mapping mode, the network device may transmit the indication information indicating the mapping mode to the UE through the high-layer signaling or the DCI dynamically when the mapping mode in Scenario 2 is adopted, or when the mapping mode in Scenario 2 is set as the default mapping mode, the network device may transmit the indication information indicating the mapping mode to the UE through the high-layer signaling or the DCI dynamically when the mapping mode in Scenario 1 is adopted.

The above description has been given with respect to the scenario where the default or non-default mapping mode has been set by the system, and the following description will be given with respect to a scenario where the default or non-default mapping mode has not been set by the system. In this scenario, not matter whether the mapping mode in Scenario 1 or Scenario 2 is adopted, the network device needs to indicate the mapping mode to the UE explicitly or implicitly.

To be specific, the network device may transmit the indication information indicating the mapping mode to the UE through the DCI or the high-layer signaling, so as to indicate the mapping mode explicitly. Alternatively, the network device may acquire the frequency-domain transmission resources occupied by the control channel and the service channel from the time-domain transmission resources occupied by the control channel, and indicate the mapping mode of the DMRS of the service channel implicitly through the frequency-domain transmission resources occupied by the control channel and the service channel. To be specific, when a size of the frequency-domain transmission resource occupied by each of the control channel and the service channel is greater than or equal to a predetermined value, the network device may implicitly indicate that parts of the DMRS of the service channel are to be mapped to the time-domain transmission resource offset by M time-domain symbols relative to the time-domain transmission resource corresponding to the control channel within the mini-slot, and when the size of the frequency-domain transmission resource occupied by each of the control channel and the service channel is smaller than the predetermined value, the network device may implicitly indicate that all of the DMRS of the service channel are to be mapped to the time-domain transmission resource offset by M time-domain symbols relative to the time-domain transmission resource corresponding to the control channel within the mini-slot. When the predetermined value is N Resource Blocks (RBs) and the size of the resource scheduled by the network device for the control channel or the service channel is smaller than N RBs, the network device may implicitly indicate that the mapping mode in Scenario 1 is to be adopted, and when the size of the resource scheduled by the network device for the control channel or the service channel is greater than or equal to N RBs, the network device may implicitly indicate that the mapping mode in Scenario 2 is to be adopted.

According to the DMRS transmission method in the embodiments of the present disclosure, in the mini-slot transmission scenario, all of or parts of the DMRS of the service channel may be mapped by the network device to the time-domain transmission resource offset by M time-domain symbols relative to the time-domain transmission resource corresponding to the control channel within the mini-slot and then transmitted. As a result, it is able to prevent the interference between the DMRS of the service channel and the control channel, improve the downlink data transmission rate, and enable the UE to rapidly detect the DMRS of the service channel and perform the channel measurement after acquiring the transmission resource for the control channel within the mini-slot, thereby to improve the data transmission rate.

The DMRS transmission method in different scenarios has been described hereinabove, and the corresponding network device will be described hereinafter in conjunction with the drawings.

Figure 12:
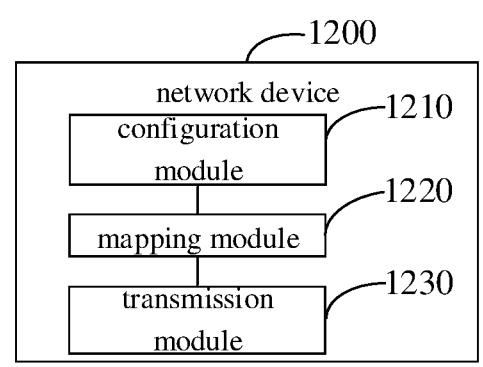
FIG. 12 is a schematic view showing the network device according to one embodiment of the present disclosure.

As shown in FIG. 12, the present disclosure further provides in some embodiments a network device 1200 capable of implementing the above-mentioned DMRS transmission method with a same technical effect, i.e.: configuring DMRS of a service channel within a mini-slot; mapping parts of or all of the DMRS of the service channel to a time-domain transmission resource offset by M time-domain symbols relative to a time-domain transmission resource corresponding to a control channel within the mini-slot, M being an integer greater than or equal to 1; and transmitting the DMRS of the service channel through the time-domain transmission resource. The network device 1200 includes: a configuration module 1210 configured to configure DMRS of a service channel within a mini-slot; a mapping module 1220 configured to map parts of or all of the DMRS of the service channel to a time-domain transmission resource offset by M time-domain symbols relative to a time-domain transmission resource corresponding to a control channel within the mini-slot, M being an integer greater than or equal to 1; and a transmission module 1230 configured to transmit the DMRS of the service channel through the time-domain transmission resource.

The mapping module 1220 may include a first mapping unit configured to map a first part of DMRS of the service channel to the time-domain transmission resource offset by M time-domain symbols relative to the time-domain transmission resource corresponding to the control channel within the mini-slot. Frequency-domain positions of frequency-domain transmission resources corresponding to the first part of DMRS may overlap frequency-domain positions of frequency-domain transmission resources corresponding to the control channel.

The mapping module 1220 may further include a second mapping unit configured to map a second part of DMRS of the service channel to transmission resources in the time-domain transmission resources corresponding to the control channel within the mini-slot and at frequency-domain positions different from the control channel. Frequency-domain positions of frequency-domain transmission resources corresponding to the second part of DMRS do not overlap the frequency-domain positions of the frequency-domain transmission resources corresponding to the control channel.

The configuration module 1210 may include: a configuration unit configured to configure predetermined parameters of each DMRS of the service channel within the mini-slot; and a transmission unit configured to transmit the predetermined parameters of each DMRS of the service channel to a UE. The predetermined parameters may include at least one of configuration type information, frequency-domain density information, time-domain position information, and port information.

The network device 1200 may further include: a first acquisition module configured to acquire a mapping mode of the DMRS of the service channel; and a processing module configured to determine whether to transmit indication information indicating the mapping mode to the UE in accordance with the mapping mode.

The processing module may include a processing unit configured to, when the indication information is to be transmitted to the UE, transmit the indication information indicating the mapping mode to the UE through DCI or high-layer signaling. The indication information may be used to indicate one of mapping parts of the DMRS of the service channel to the time-domain transmission resource offset by M time-domain symbols relative to the time-domain transmission resource corresponding to the control channel within the mini-slot, and mapping all of the DMRS of the service channel to the time-domain transmission resource offset by M time-domain symbols relative to the time-domain transmission resource corresponding to the control channel within the mini-slot.

The network device 1200 may further include: a second acquisition module configured to acquire frequency-domain transmission resources occupied by the control channel and frequency-domain transmission resources occupied by the service channel from the time-domain transmission resources occupied by the control channel; and an indication module configured to indicate the mapping mode of the DMRS of the service channel through the frequency-domain transmission resources occupied by the control channel and the frequency-domain transmission resources occupied by the service channel.

The indication module may further include: a first indication unit configured to, when a size of the frequency-domain transmission resource occupied by each of the control channel and the service channel is greater than or equal to a predetermined value, indicate that parts of the DMRS of the service channel are to be mapped to the time-domain transmission resource offset by M time-domain symbols relative to the time-domain transmission resource corresponding to the control channel within the mini-slot;

and a second indication unit configured to, when the size of the frequency-domain transmission resource occupied by each of the control channel and the service channel is smaller than the predetermined value, indicate that all of the DMRS of the service channel are to be mapped to the time-domain transmission resource offset by M time-domain symbols relative to the time-domain transmission resource corresponding to the control channel within the mini-slot.

The service channel may include a PUSCH or a PDSCH, and the control channel may include a PUCCH or a PDCCH.

It should be appreciated that, according to the embodiments of the present disclosure, in the mini-slot transmission scenario, the network device may map all of or parts of the DMRS of the service channel to the time-domain transmission resource offset by M time-domain symbols relative to the time-domain transmission resource corresponding to the control channel within the mini-slot and then transmit the DMRS. As a result, it is able to prevent the interference between the DMRS of the service channel and the control channel, improve the downlink data transmission rate, and enable the UE to rapidly detect the DMRS of the service channel and perform the channel measurement after acquiring the transmission resource for the control channel within the mini-slot, thereby to improve the data transmission rate.

Figure 13:
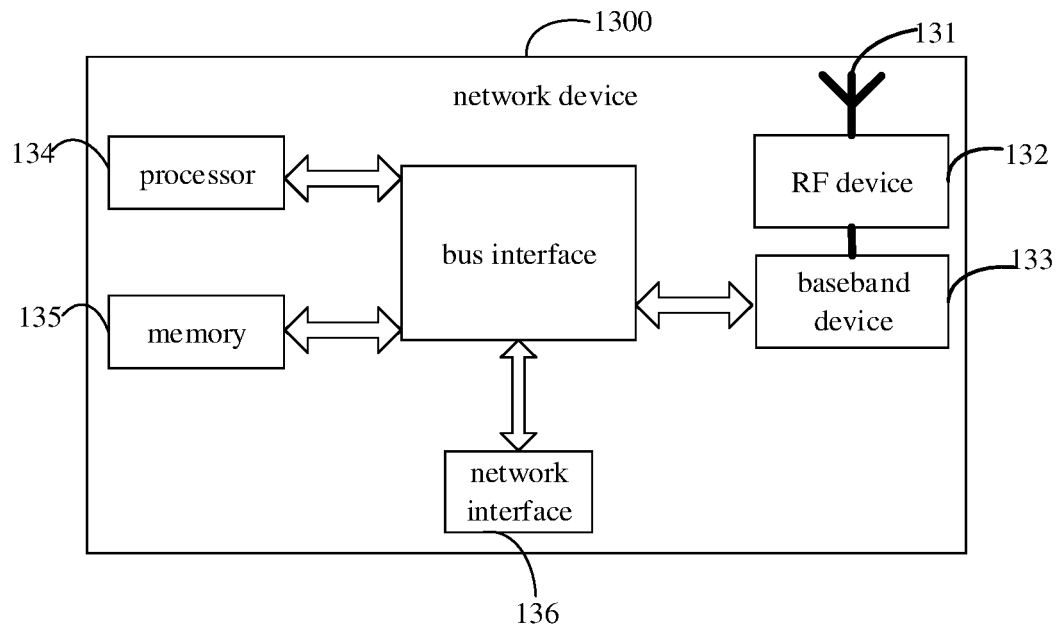
FIG. 13 is a block diagram of the network device according to one embodiment of the present disclosure.

The present disclosure further provides in some embodiments a network device 1300 which, as shown in FIG. 13, includes an antenna 131, a Radio Frequency (RF) unit 132, and a baseband unit 133. The antenna 131 is connected to the RF unit 132. In an uplink direction, the RF unit 132 is configured to receive information via the antenna 131, and transmit the received information to the baseband unit 133 for processing. In a downlink direction, the baseband unit 133 is configured to process to-be-transmitted information, and transmit the processed information to the RF unit 132. The RF unit 132 is configured to process the received information and transmit the processed information via the antenna 131.

A frequency band processing unit may be located within the baseband unit 133, so that the above DMRS transmission method for the network device may be implemented within the baseband unit 133. The baseband unit 133 may include a processor 134 and a memory 135.

The baseband unit 133 may, e.g., include at least one baseband board on which a plurality of chips is located, as shown in FIG. 13. One chip may be, e.g., the processor 134 connected to the memory 135 and configured to call a program stored in the memory 135 so as to perform operations for the network device in the above-mentioned method embodiments.

The baseband unit 133 may further include a network interface 136 configured to exchange information with the RF unit 132. The network interface may be, e.g., a Common Public Radio Interface (CPRI).

Here, the processor may include merely one processor, or a plurality of processing elements. For example, the processor may be a Central Processing Unit (CPU), an Application Specific Integrated Circuit (ASIC), or one or more ICs configured to implement the above-mentioned method for the network device, e.g., one or more Digital Signal Processors (DSPs), or one or more Field Programmable Gate Arrays (FPGAs). The memory may include merely one memory, or a plurality of storage elements.

It should be appreciated that, the memory 135 may be a volatile memory, a nonvolatile memory or both. The non-volatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 135 intends to include, but not limited to, the above-mentioned and any other appropriate memories.

To be specific, in some embodiments of the present disclosure, the network device may further include a computer program stored in the memory 135 and executed by the processor 134. The processor 134 is configured to call the computer program in the memory 135 so as to implement the DMRS transmission method executed by the modules in FIG. 12.

To be specific, the processor 134 is configured to call the computer program, so as to: configure DMRS of a service channel within a mini-slot; map parts of or all of the DMRS of the service channel to a time-domain transmission resource offset by M time-domain symbols relative to a time-domain transmission resource corresponding to a control channel within the mini-slot, M being an integer greater than or equal to 1; and transmit the DMRS of the service channel through the time-domain transmission resource.

To be specific, the processor 134 is further configured to call the computer program, so as to map a first part of DMRS of the service channel to the time-domain transmission resource offset by M time-domain symbols relative to the time-domain transmission resource corresponding to the control channel within the mini-slot. Frequency-domain positions of frequency-domain transmission resources corresponding to the first part of DMRS may overlap frequency-domain positions of frequency-domain transmission resources corresponding to the control channel.

To be specific, the processor 134 is further configured to call the computer program, so as to map a second part of DMRS of the service channel to transmission resources in the time-domain transmission resources corresponding to the control channel within the mini-slot and at frequency-domain positions different from the control channel. Frequency-domain positions of frequency-domain transmission resources corresponding to the second part of DMRS may not overlap the frequency-domain positions of the frequency-domain transmission resources corresponding to the control channel.

To be specific, the processor 134 is further configured to call the computer program, so as to: configure predetermined parameters of each DMRS of the service channel within the mini-slot; and transmit the predetermined parameters of each DMRS of the service channel to a UE. The predetermined parameters may include at least one of configuration type information, frequency-domain density information, time-domain position information, and port information.

To be specific, the processor 134 is further configured to call the computer program, so as to: acquire a mapping mode of the DMRS of the service channel; and determine whether to transmit indication information indicating the mapping mode to the UE in accordance with the mapping mode.

To be specific, the processor 134 is further configured to call the computer program, so as to, when the indication information is to be transmitted to the UE, transmit the indication information indicating the mapping mode to the UE through DCI or high-layer signaling. The indication information may be used to indicate one of mapping parts of the DMRS of the service channel to the time-domain transmission resource offset by M time-domain symbols relative to the time-domain transmission resource corresponding to the control channel within the mini-slot, and mapping all of the DMRS of the service channel to the time-domain transmission resource offset by M time-domain symbols relative to the time-domain transmission resource corresponding to the control channel within the mini-slot.

To be specific, the processor 134 is further configured to call the computer program, so as to: acquire frequency-domain transmission resources occupied by the control channel and frequency-domain transmission resources occupied by the service channel from the time-domain transmission resources occupied by the control channel; and indicate the mapping mode of the DMRS of the service channel through the frequency-domain transmission resources occupied by the control channel and the frequency-domain transmission resources occupied by the service channel.

To be specific, the processor 134 is further configured to call the computer program, so as to: when a size of the frequency-domain transmission resource occupied by each of the control channel and the service channel is greater than or equal to a predetermined value, indicate that parts of the DMRS of the service channel are to be mapped to the time-domain transmission resource offset by M time-domain symbols relative to the time-domain transmission resource corresponding to the control channel within the mini-slot; and when the size of the frequency-domain transmission resource occupied by each of the control channel and the service channel is smaller than the predetermined value, indicate that all of the DMRS of the service channel are to be mapped to the time-domain transmission resource offset by M time-domain symbols relative to the time-domain transmission resource corresponding to the control channel within the mini-slot.

The service channel may include a PUSCH or a PDSCH, and the control channel may include a PUCCH or a PDCCH.

According to the embodiments of the present disclosure, in the mini-slot transmission scenario, the network device may map all of or parts of the DMRS of the service channel to the time-domain transmission resource offset by M time-domain symbols relative to the time-domain transmission resource corresponding to the control channel within the mini-slot and then transmit the DMRS. As a result, it is able to prevent the interference between the DMRS of the service channel and the control channel, improve the downlink data transmission rate, and enable the UE to rapidly detect the DMRS of the service channel and perform the channel measurement after acquiring the transmission resource for the control channel within the mini-slot, thereby to improve the data transmission rate.

The present disclosure further provides in some embodiments a network device including a processor 134, a memory 135, and a computer program stored in the memory 135 and executed by the processor 134. The processor 134 is configured to execute the computer program so as to implement the above-mentioned DMRS transmission method with a same technical effect, which will not be particularly defined herein. The network device may be a Base Transceiver Station (BTS) in a Global System of Mobile Communication (GSM) system or a Code Division Multiple Access (CDMA) system, a Node B (NB) in a Wideband Code Division Multiple Access (WCDMA) system, an Evolved Node B (eNB, or eNodeB) in an LTE system, a relay or an access point, or a base station in a 5G network, which will not be particularly defined herein.

The present disclosure further provides in some embodiments a computer-readable storage medium storing therein a computer program. The computer program is executed by a processor so as to implement the above-mentioned DMRS transmission method with a same technical effect, which will not be particularly defined herein. The computer-readable storage medium may be an ROM, an RAM, a magnetic disk or an optical disk.

The DMRS transmission method applied for the network device has been described hereinabove, and a DMRS transmission method applied for the UE will be described hereinafter in conjunction with the drawings.

Figure 14:
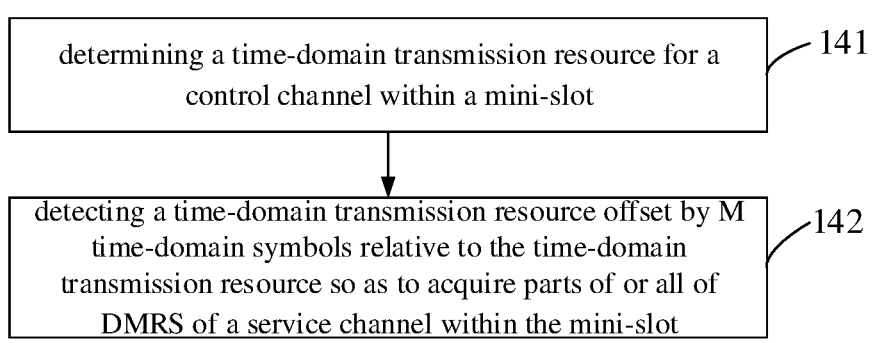
FIG. 14 is a flow chart of a DMRS transmission method applied for a UE according to one embodiment of the present disclosure.

The present disclosure further provides a DMRS transmission method applied for a UE which, as shown in FIG. 14, includes the following steps.

Step 141: determining a time-domain transmission resource of a control channel within a mini-slot.

In the NR system, a normal slot (also called as slot) has a length of 7 or 14 time-domain symbols (or OFDM symbols). A slot having a length smaller than the normal slot may be called as short slot or mini-slot.

Step 142: detecting a time-domain transmission resource offset by M time-domain symbols relative to the time-domain transmission resource so as to acquire parts of or all of DMRS of a service channel within the mini-slot, M being an integer greater than or equal to 1.

In the mini-slot transmission scenario, the control channel and the service channel may occur on one or more time-domain symbols concurrently, and at this time, the network device needs to configure the DMRS of the control channel and the service channel, respectively. Here, the service channel may include a PUSCH or a PDSCH, and the control channel may include a PUCCH or a PDCCH. The network device may map parts of or all of the DMRS of the PUSCH to the resource offset by M OFDM symbols relative to the transmission resource for the PUCCH, or map parts of or all of the DMRS of the PDSCH to the resource offset by M OFDM symbols relative to the transmission resource for the PDCCH. In this regard, during the detection of the DMRS by the UE, it is able to prevent the interference between the DMRS of the control channel and the service channel, and rapidly demodulate the service channel.

Further, corresponding to Scenario 1, Step 142 may include detecting the time-domain transmission resource offset by M time-domain symbols relative to the time-domain transmission resource for the control channel so as to acquire all of the DMRS of the service channel within the mini-slot. In other words, the network device may map all the DMRS of the service channel to the transmission resource offset by M time-domain symbols relative to the time-domain transmission resource for the control channel.

Further, corresponding to Scenario 2, Step 142 may include detecting the time-domain transmission resource offset by M time-domain symbols relative to the time-domain transmission resource for the control channel so as to acquire a first part of DMRS of the service channel within the mini-slot. Frequency-domain positions of frequency-domain transmission resources corresponding to the first part of DMRS may overlap frequency-domain positions of frequency-domain transmission resources corresponding to the control channel. In other words, parts of the DMRS of the service channel overlapping the frequency-domain transmission resources corresponding to the control channel may be offset backward by M time-domain symbols, so as to prevent the interference between the DMRS of the service channel and the control channel, and improve the downlink data transmission rate.

In addition, Step 142 may include detecting transmission resources in the time-domain transmission resources corresponding to the control channel within the mini-slot and at frequency-domain positions different from the control channel so as to acquire a second part of DMRS of the service channel within the mini-slot. Frequency-domain positions of frequency-domain transmission resources corresponding to the second part of DMRS may not overlap the frequency-domain positions of the frequency-domain transmission resources corresponding to the control channel. In other words, the network device may map parts of the DMRS of the service channel not overlapping the frequency-domain transmission resources corresponding to the control channel to the time-domain transmission resource corresponding to the control channel, so as to improve the resource utilization.

When various DMRS mapping modes are supported by a system, Step 142 may further include: acquiring a mapping mode of the DMRS of the service channel; and detecting the time-domain transmission resource offset by M time-domain symbols relative to the time-domain transmission resource corresponding to the control channel in accordance with the mapping mode, so as to acquire parts of or all of the DMRS of the service channel within the mini-slot.

The acquiring the mapping mode of the DMRS of the service channel may include receiving indication information indicating the mapping mode from the network device through DCI or high-layer signaling. This indication mode is an explicit one. The indication information may be used to indicate one of mapping parts of the DMRS of the service channel to the time-domain transmission resource offset by M time-domain symbols relative to the time-domain transmission resource corresponding to the control channel within the mini-slot, and mapping all of the DMRS of the service channel to the time-domain transmission resource offset by M time-domain symbols relative to the time-domain transmission resource corresponding to the control channel within the mini-slot.

Alternatively, the acquiring the mapping mode of the DMRS of the service channel may include: acquiring frequency-domain transmission resources occupied by the control channel and frequency-domain transmission resources occupied by the service channel from the time-domain transmission resources occupied by the control channel; and determining the mapping mode of the DMRS of the service channel in accordance with the frequency-domain transmission resources occupied by the control channel and the frequency-domain transmission resources occupied by the service channel. This indication mode is an implicit one.

The determining the mapping mode of the DMRS of the service channel in accordance with the frequency-domain transmission resources occupied by the control channel and the frequency-domain transmission resources occupied by the service channel may include: when a size of the frequency-domain transmission resource occupied by each of the control channel and the service channel is greater than or equal to a predetermined value, determining that parts of the DMRS of the service channel are to be mapped to the time-domain transmission resource offset by M time-domain symbols relative to the time-domain transmission resource corresponding to the control channel within the mini-slot, and when the size of the frequency-domain transmission resource occupied by each of the control channel and the service channel is smaller than the predetermined value, determining that all of the DMRS of the service channel are to be mapped to the time-domain transmission resource offset by M time-domain symbols relative to the time-domain transmission resource corresponding to the control channel within the mini-slot. When the predetermined value is N RBs and the size of the detected resource occupied by the control channel or the service channel is smaller than N RBs, the mapping mode in Scenario 1 may be implicitly indicated to be adopted, and when the size of the resource scheduled by the network device for the control channel or the service channel is greater than or equal to N RBs, the mapping mode in Scenario 2 may be implicitly indicated to be adopted.

According to the DMRS transmission method in the embodiments of the present disclosure, in the mini-slot transmission scenario, the UE may detect the time-domain transmission resource offset by M time-domain symbols relative to the time-domain transmission resource corresponding to the control channel, so as to acquire parts of or all of the DMRS of the service channel. As a result, it is able to prevent the interference between the DMRS of the service channel and the control channel, rapidly detect the DMRS of the service channel and perform the channel measurement, thereby to improve the data transmission rate.

The DMRS transmission method for the UE in different scenarios has been described hereinabove, and the corresponding UE will be described hereinafter in conjunction with the drawings.

Figure 15:
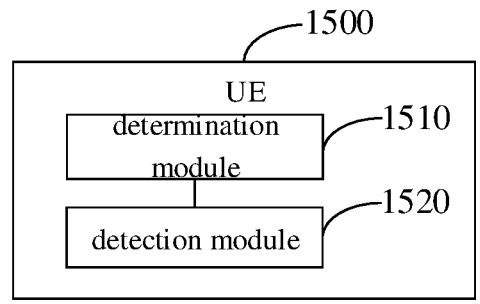
FIG. 15 is a schematic view showing the UE according to one embodiment of the present disclosure.

As shown in FIG. 15, the present disclosure further provides in some embodiments a UE 1500 capable of implementing the above-mentioned DMRS transmission method with a same technical effect, i.e.: determining a time-domain transmission resource for a control channel within a mini-slot; and detecting a time-domain transmission resource offset by M time-domain symbols relative to the time-domain transmission resource so as to acquire parts of or all of DMRS of a service channel within the mini-slot, M being an integer greater than or equal to 1. The UE 1500 includes: a determination module 1510 configured to determine a time-domain transmission resource for a control channel within a mini-slot; and a detection module 1520 configured to detect a time-domain transmission resource offset by M time-domain symbols relative to the time-domain transmission resource so as to acquire parts of or all of DMRS of a service channel within the mini-slot, M being an integer greater than or equal to 1.

The detection module 1520 may include a first detection unit configured to detect the time-domain transmission resource offset by M time-domain symbols relative to the time-domain transmission resource for the control channel so as to acquire a first part of DMRS of the service channel within the mini-slot. Frequency-domain positions of frequency-domain transmission resources corresponding to the first part of DMRS may overlap frequency-domain positions of frequency-domain transmission resources corresponding to the control channel.

The detection module 1520 may further include a second detection unit configured to detect transmission resources in the time-domain transmission resources corresponding to the control channel within the mini-slot and at frequency-domain positions different from the control channel so as to acquire a second part of DMRS of the service channel within the mini-slot. Frequency-domain positions of frequency-domain transmission resources corresponding to the second part of DMRS may not overlap the frequency-domain positions of the frequency-domain transmission resources corresponding to the control channel.

The detection module 1520 may further include: an acquisition unit configured to acquire a mapping mode of the DMRS of the service channel; and a detection unit configured to detect the time-domain transmission resource offset by M time-domain symbols relative to the time-domain transmission resource corresponding to the control channel in accordance with the mapping mode, so as to acquire parts of or all of the DMRS of the service channel within the mini-slot.

The acquisition unit may include a first acquisition sub-unit configured to receive indication information indicating the mapping mode from the network device through DCI or high-layer signaling. The indication information may be used to indicate one of mapping parts of the DMRS of the service channel to the time-domain transmission resource offset by M time-domain symbols relative to the time-domain transmission resource corresponding to the control channel within the mini-slot, and mapping all of the DMRS of the service channel to the time-domain transmission resource offset by M time-domain symbols relative to the time-domain transmission resource corresponding to the control channel within the mini-slot.

The acquisition unit may further include: a second acquisition sub-unit configured to acquire frequency-domain transmission resources occupied by the control channel and frequency-domain transmission resources occupied by the service channel from the time-domain transmission resources occupied by the control channel; and a determination sub-unit configured to determine the mapping mode of the DMRS of the service channel in accordance with the frequency-domain transmission resources occupied by the control channel and the frequency-domain transmission resources occupied by the service channel.

The determination sub-unit is further configured to: when a size of the frequency-domain transmission resource occupied by each of the control channel and the service channel is greater than or equal to a predetermined value, determine that parts of the DMRS of the service channel are to be mapped to the time-domain transmission resource offset by M time-domain symbols relative to the time-domain transmission resource corresponding to the control channel within the mini-slot, and when the size of the frequency-domain transmission resource occupied by each of the control channel and the service channel is smaller than the predetermined value, determine that all of the DMRS of the service channel are to be mapped to the time-domain transmission resource offset by M time-domain symbols relative to the time-domain transmission resource corresponding to the control channel within the mini-slot.

The service channel may include a PUSCH or a PDSCH, and the control channel may include a PUCCH or a PDCCH.

It should be appreciated that, according to the embodiments of the present disclosure, in the mini-slot transmission scenario, the UE may detect the time-domain transmission resource offset by M time-domain symbols relative to the time-domain transmission resource corresponding to the control channel, so as to acquire parts of or all of the DMRS of the service channel. As a result, it is able to prevent the interference between the DMRS of the service channel and the control channel, rapidly detect the DMRS of the service channel and perform the channel measurement, thereby to improve the data transmission rate.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, the determination module may be stored in the memory of the above-mentioned device in the form of a program code, and may be called and executed by a processing element of the above-mentioned device so as to achieve the function of the determination module. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Figure 16:
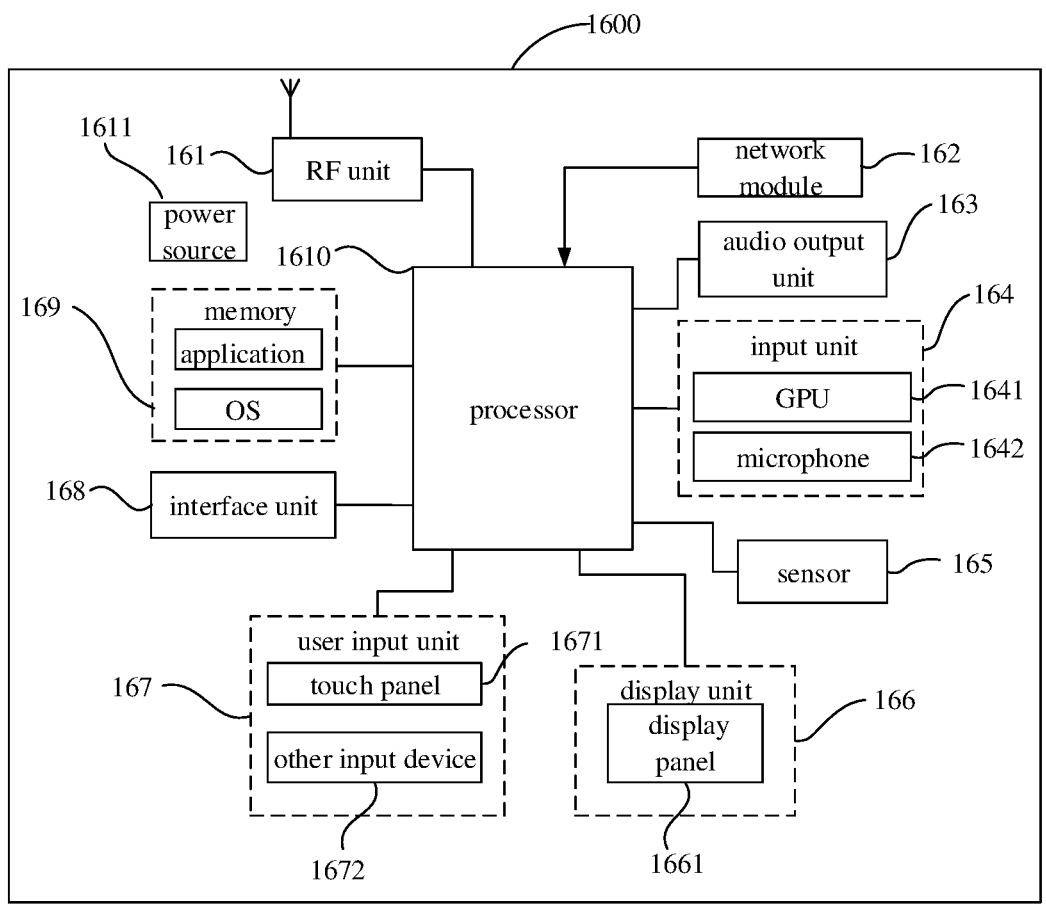
FIG. 16 is a block diagram of the UE according to one embodiment of the present disclosure.

In order to achieve the purpose in a better manner, as shown in FIG. 16, the present disclosure further provides in some embodiments a UE 1600 which includes, but not limited to, an RF unit 161, a network module 162, an audio output unit 163, an input unit 164, a sensor 165, a display unit 166, a user input unit 167, an interface unit 168, a memory 169, a processor 1610, and a power source 1611. It should be appreciated that, the structure in FIG. 16 shall not be construed as limiting the UE. The UE may include more or fewer members, or some members may be combined, or the UE may include some other members not shown in FIG. 16. In the embodiments of the present disclosure, the UE may include, but not limited to, mobile phone, flat-panel computer, laptop computer, Personal Digital Assistant (PDA), vehicle-mounted terminal, wearable device or pedometer.

The processor 1610 is configured to determine a time-domain transmission resource for a control channel within a mini-slot. The RF unit 161 is configured to detect a time-domain transmission resource offset by M time-domain symbols relative to the time-domain transmission resource so as to acquire parts of or all of DMRS of a service channel within the mini-slot, M being an integer greater than or equal to 1.

According to the embodiments of the present disclosure, in the mini-slot transmission scenario, the UE may detect the time-domain transmission resource offset by M time-domain symbols relative to the time-domain transmission resource corresponding to the control channel, so as to acquire parts of or all of the DMRS of the service channel. As a result, it is able to prevent the interference between the DMRS of the service channel and the control channel, rapidly detect the DMRS of the service channel and perform the channel measurement, thereby to improve the data transmission rate.

It should be appreciated that, in the embodiments of the present disclosure, the RF unit 161 is configured to transmit and receive signals during the information transmission or phone call. To be specific, the RF unit 161 may, upon the receipt of downlink data from a base station, transmit the downlink data to the processor 1610 for subsequent treatment. In addition, the RF unit 161 may transmit uplink data to the base station. Usually, the RF unit 161 may include, but not limited to, an antenna, at least one amplifier, a transceiver, a coupler, a low-noise amplifier and a duplexer. In addition, the RF unit 161 may communicate with a network and the other devices via a wireless communication system.

The network module 162 is configured to enable the UE to access the broadband Internet in a wireless manner, e.g., help a user to receive and send an e-mail, browse a web page or access a streaming media.

The audio output unit 163 is configured to convert audio data received by the RF unit 161 or the network module 162, or audio data stored in the memory 169, into an audio signal and output the audio signal as a sound. In addition, the audio output unit 163 is further configured to provide an audio output related to a specific function executed by the UE 1600 (e.g., a sound occurring when a calling signal or a message has been received). The audio output unit 163 may include a loudspeaker, a buzzer and a receiver.

The input unit 164 is configured to receive an audio or video signal. It may include a Graphics Processing Unit (GPU) 1641 and a microphone 1642. The GPU 1641 is configured to process image data of a static image or video acquired by an image collection unit (e.g., a camera) in a video capturing mode or an image capturing mode, and a processed image frame may be displayed by the display unit 166. The image frame processed by the GPU 1641 may be stored in the memory 169 (or any other storage medium) or transmitted via the RF unit 161 or network module 162. The microphone 1642 is configured to receive a sound, and convert the sound into voice data. In a call mode, the processed audio data may be converted into data in a format capable of being transmitted by the RF unit 161 to a mobile communication base station.

The at least one sensor 165 may include a light sensor, a movement sensor and the other sensors. To be specific, the light sensor may include an ambient light sensor or a proximity sensor. The ambient light sensor is configured to adjust a brightness value of a display panel 1661 in accordance with ambient light. The proximity sensor is configured to turn off the display panel 1661 and/or a backlight source when the UE 1600 moves close to an ear. As one of the movement sensors, an accelerometer may detect acceleration in various directions (usually a three-axis accelerometer), and detect a level and a direction of a gravity force in a static state. Through the accelerometer, it is able to identify a posture of the UE (e.g., perform a switching operation between portrait and landscape orientations, play relevant games, and calibrate a posture of a magnetometer), and perform vibration-related functions (e.g., count steps and strikes). The sensor 165 may further include a fingerprint sensor, a pressure sensor, an iris sensor, a molecule sensor, a gyroscope, a barometer, a hygrometer, a thermometer or an infrared sensor, which will not be particularly defined herein.

The display unit 166 is configured to display information inputted by the user or provided to the user. The display unit 166 may include the display panel 1661, e.g., a Liquid Crystal Display (LCD) panel, or an Organic Light-Emitting Diode (OLED) panel.

The user input unit 167 is configured to receive digital or character information inputted by the user, and generate a key signal input related to user settings and function control of the UE. To be specific, the user input unit 167 may include a touch panel 1671 and an input device 1672. The touch panel 1671, also called as touch screen, is configured to collect a touch operation made by the user on or in proximity to the touch panel (e.g., an operation made by the user through any appropriate object or attachment (e.g., finger or stylus) on or in the proximity to the touch panel 1671). The touch panel 1671 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 1610, and receive and execute a command from the processor 1610. In addition, the touch panel 1671 may be of a resistive type, a capacitive type, an infrared type or a surface acoustic wave (SAW) type. The other input device 1672 may include, but not limited to, a physical keyboard, a functional button (e.g., a volume control button or an on/off button), a trackball, a mouse, and a joystick, which will not be particularly defined herein.

Further, the touch panel 1671 may cover the display panel 1661. When the touch operation made on or in proximity to the touch panel 1671 has been detected, the touch panel 14071 may transmit the touch information to the processor 1610, so as to determine a type of a touch event. Then, the processor 1610 may control the display panel 1661 to provide a corresponding visual output in accordance with the type of the touch event. Although the touch panel 1671 and the display panel 1661 are configured as two separate members in FIG. 16, in some embodiments of the present disclosure, they may be integrated so as to achieve the input and output functions of the electronic device, which will not be particularly defined herein.

The interface unit 168 is configured to provide an interface between an external device and the UE 1600. For example, the external device may include a wired or wireless headset port, an external power source port (or a charging port), a wired or wireless data port, a memory card port, a port for a device having an identification module, an audio input/output (I/O) port, a video I/O port, and an earphone port. The interface unit 168 is configured to receive an input from the external device (e.g., data information and electricity) and transmit the input to one or more elements of the UE 1600, or transmit data between the UE 1600 and the external device.

The memory 169 is configured to store therein a software application and various data. It may mainly include an application storage area and a data storage area. An operating system and at least one application for the functions (e.g., an audio/image playing function) may be stored in the application storage area. Data created in accordance with the operation of the mobile phone (e.g., audio data and textbook) may be stored in the data storage area. In addition, the memory 169 may include a high-speed random access memory (RAM), or a non-volatile memory (e.g., at least one magnetic disk or flash memory), or any other volatile solid state memory.

As a control center of the electronic device, the processor 1610 may be connected to the other members of the electronic device via various interfaces and circuits, and configured to run or execute the software program and/or module stored in the memory 169, and call the data stored in the memory 169, so as to execute the functions of the electronic device and process the data, thereby to monitor the entire electronic device. The processor 1610 may include one or more processing units. In a possible embodiment of the present disclosure, an application processor and a modem may be integrated into the processor 1610. The application processor is mainly configured to process the operating system, a user interface and the application. The modem is mainly configured to process wireless communication. It should be appreciated that, the modem may also not be integrated into the processor 1610.

The power source 1611 (e.g., a battery) is configured to supply power to the members of the UE 1600. In a possible embodiment of the present disclosure, the power source 1611 is logically connected to the processor 1610 via a power source management system, so as to achieve such functions as charging, discharging and power consumption management through the power source management system.

In addition, the UE 1600 may include some functional modules not shown in FIG. 16, which will not be particularly defined herein.

The present disclosure further provides in some embodiments a UE, which includes a processor 1610, a memory 169, and a computer program stored in the memory 169 and executed by the processor 1610. The processor 1610 is configured to execute the computer program so as to implement the above-mentioned DMRS transmission method with a same technical effect, which will not be particularly defined herein. The UE may be a wireless UE or a wired UE. The wireless UE may be a device capable of providing voice data and/or any other service data to a user, e.g., a handheld device having a wireless connection function, or any other processing device capable of being connected to a wireless modem. The wireless UE may communicate with one or more core networks via a Radio Access Network (RAN). The wireless UE may be a mobile terminal, e.g., a mobile phone (or cellular phone), or a computer having the mobile terminal, e.g., a portable, pocket-sized, handheld, built-in or vehicle-mounted mobile device, which are capable of exchanging voice and/or data with the RAN. For example, the wireless UE may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal may also be called as system, subscriber unit, subscriber station, mobile station, mobile, remote station, remote terminal, access terminal, user terminal, user agent or user device, which will not be particularly defined herein.

The present disclosure further provides in some embodiments a computer-readable storage medium storing therein a computer program. The computer program is executed by a processor so as to implement the above-mentioned DMRS transmission method with a same technical effect, which will not be particularly defined herein. The computer-readable storage medium may be an ROM, an RAM, a magnetic disk or an optical disk.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure.

In addition, the steps for executing the above-mentioned processings may be performed in a chronological order. Of course, some steps may also be performed in parallel, or independently of each other.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Demodulation Reference Signal (DMRS) transmission method applied for a network device, comprising:
    configuring DMRS of a service channel within a mini-slot;
    mapping parts of or all of the DMRS of the service channel to a time-domain transmission resource, the time-domain transmission resource being offset by M time-domain symbols relative to a time-domain transmission resource corresponding to a control channel within the mini-slot, M being an integer greater than or equal to 1; and
    transmitting the DMRS of the service channel through the time-domain transmission resource;
    wherein subsequent to configuring the DMRS of the service channel within the mini-slot, the DMRS transmission method further comprises:
    acquiring frequency-domain transmission resources occupied by the control channel and frequency-domain transmission resources occupied by the service channel from the time-domain transmission resources occupied by the control channel; and
    indicating the mapping mode of the DMRS of the service channel through the frequency-domain transmission resources occupied by the control channel and the frequency-domain transmission resources occupied by the service channel;
    wherein the indicating the mapping mode of the DMRS of the service channel through the frequency-domain transmission resources occupied by the control channel and the frequency-domain transmission resources occupied by the service channel comprises:
    indicating, when a size of the frequency-domain transmission resource occupied by each of the control channel and the service channel is greater than or equal to a predetermined value, that parts of the DMRS of the service channel are to be mapped to the time-domain transmission resource offset by M time-domain symbols relative to the time-domain transmission resource corresponding to the control channel within the mini-slot; and
    indicating when the size of the frequency-domain transmission resource occupied by each of the control channel and the service channel is smaller than the predetermined value, that all of the DMRS of the service channel are to be mapped to the time-domain transmission resource offset by M time-domain symbols relative to the time-domain transmission resource corresponding to the control channel within the mini-slot.

2. A network device, comprising a processor, a memory, and a computer program stored in the memory and executed by the processor, wherein the processor is configured to execute the computer program so as to implement the DMRS transmission method according to claim 1.

3. The network device according to claim 2, wherein the processor is further configured to execute the computer program so as to map a first part of DMRS of the service channel to the time-domain transmission resource, the time-domain transmission resource being offset by M time-domain symbols relative to the time-domain transmission resource corresponding to the control channel within the mini-slot, wherein frequency-domain positions of frequency-domain transmission resources corresponding to the first part of DMRS overlap with frequency-domain positions of frequency-domain transmission resources corresponding to the control channel.

4. The network device according to claim 2, wherein the processor is further configured to execute the computer program so as to map a second part of DMRS of the service channel to transmission resources in the time-domain transmission resources corresponding to the control channel within the mini-slot and at frequency-domain positions different from the control channel, wherein frequency-domain positions of frequency-domain transmission resources corresponding to the second part of DMRS do not overlap with the frequency-domain positions of the frequency-domain transmission resources corresponding to the control channel.

5. The network device according to claim 2, wherein the processor is further configured to execute the computer program so as to configure predetermined parameters of the DMRS of the service channel within the mini-slot; and
    transmit the predetermined parameters of each DMRS of the service channel to a User Equipment (UE),
    wherein the predetermined parameters comprise at least one of configuration type information, frequency-domain density information, time-domain position information, and port information.

6. The DMRS transmission method according to claim 1, wherein the mapping parts of or all of the DMRS of the service channel to a time-domain transmission resource, the time-domain transmission resource being offset by M time-domain symbols relative to a time-domain transmission resource corresponding to a control channel within the mini-slot comprises:
    mapping a first part of DMRS of the service channel to the time-domain transmission resource, the time-domain transmission resource being offset by M time-domain symbols relative to the time-domain transmission resource corresponding to the control channel within the mini-slot, wherein frequency-domain positions of frequency-domain transmission resources corresponding to the first part of DMRS overlap with frequency-domain positions of frequency-domain transmission resources corresponding to the control channel.

7. The DMRS transmission method according to claim 1, further comprising:
    mapping a second part of DMRS of the service channel to transmission resources in the time-domain transmission resources corresponding to the control channel within the mini-slot and at frequency-domain positions different from the control channel, wherein frequency-domain positions of frequency-domain transmission resources corresponding to the second part of DMRS do not overlap with the frequency-domain positions of the frequency-domain transmission resources corresponding to the control channel.

8. The DMRS transmission method according to claim 1, wherein the configuring the DMRS of the service channel within the mini-slot comprises:

configuring predetermined parameters of the DMRS of the service channel within the mini-slot; and transmitting the predetermined parameters of each DMRS of the service channel to a User Equipment (UE), wherein the predetermined parameters comprise at least one of configuration type information, frequency-domain density information, time-domain position information, and port information.

9. The DMRS transmission method according to claim 1, wherein the service channel comprises a Physical Uplink Shared Channel (PUSCH) or a Physical Downlink Shared Channel (PDSCH), and the control channel comprises a Physical Uplink Control Channel (PUCCH) or a Physical Downlink Control Channel (PDCCH).

10. A non-transitory computer-readable storage medium storing therein a computer program, wherein the computer program is executed by a processor so as to implement the DMRS transmission method according to claim 1.

11. A DMRS transmission method applied for a UE, comprising:

determining a time-domain transmission resource for a control channel within a mini-slot; and detecting a time-domain transmission resource offset by M time-domain symbols relative to the time-domain transmission resource so as to acquire parts of or all of DMRS of a service channel within the mini-slot, M being an integer greater than or equal to 1;

wherein detecting the time-domain transmission resource offset by M time-domain symbols relative to the time-domain transmission resource so as to acquire parts of or all of the DMRS of the service channel within the mini-slot comprises:

acquiring a mapping mode of the DMRS of the service channel; and detecting the time-domain transmission resource offset by M time-domain symbols relative to the time-domain transmission resource corresponding to the control channel in accordance with the mapping mode, so as to acquire parts of or all of the DMRS of the service channel within the mini-slot;

wherein the acquiring the mapping mode of the DMRS of the service channel comprises:

acquiring frequency-domain transmission resources occupied by the control channel and frequency-domain transmission resources occupied by the service channel from the time-domain transmission resources occupied by the control channel; and determining the mapping mode of the DMRS of the service channel in accordance with the frequency-domain transmission resources occupied by the control channel and the frequency-domain transmission resources occupied by the service channel;

wherein the determining the mapping mode of the DMRS of the service channel in accordance with the frequency-domain transmission resources occupied by the control channel and the frequency-domain transmission resources occupied by the service channel comprises:

determining, when a size of the frequency-domain transmission resource occupied by each of the control channel and the service channel is greater than or equal to a predetermined value, that parts of the DMRS of the service channel are to be mapped to the time-domain transmission resource offset by M time-domain symbols relative to the time-domain transmission resource corresponding to the control channel within the mini-slot, and determining, when the size of the frequency-domain transmission resource occupied by each of the control channel and the service channel is smaller than the predetermined value, that all of the DMRS of the service channel are to be mapped to the time-domain transmission resource offset by M time-domain symbols relative to the time-domain transmission resource corresponding to the control channel within the mini-slot.

12. The DMRS transmission method according to claim 11, wherein the detecting the time-domain transmission resource offset by M time-domain symbols relative to the time-domain transmission resource so as to acquire parts of or all of the DMRS of the service channel within the mini-slot comprises:

detecting the time-domain transmission resource offset by M time-domain symbols relative to the time-domain transmission resource so as to acquire a first part of DMRS of the service channel within the mini-slot, wherein frequency-domain positions of frequency-domain transmission resources corresponding to the first part of DMRS overlap frequency-domain positions of frequency-domain transmission resources corresponding to the control channel.

13. The DMRS transmission method according to claim 11, wherein the detecting the time-domain transmission resource offset by M time-domain symbols relative to the time-domain transmission resource so as to acquire parts of or all of the DMRS of the service channel within the mini-slot further comprises:

detecting transmission resources in the time-domain transmission resources corresponding to the control channel within the mini-slot and at frequency-domain positions different from the control channel so as to acquire a second part of DMRS of the service channel within the mini-slot, wherein frequency-domain positions of frequency-domain transmission resources corresponding to the second part of DMRS do not overlap the frequency-domain positions of the frequency-domain transmission resources corresponding to the control channel.

14. The DMRS transmission method according to claim 11, wherein the service channel comprises a PUSCH or a PDSCH, and the control channel comprises a PUCCH or a PDCCH.

15. A non-transitory computer-readable storage medium storing therein a computer program, wherein the computer program is executed by a processor so as to implement the DMRS transmission method according to claim 11.

16. A UE, comprising a processor, a memory, and a computer program stored in the memory and executed by the processor, wherein the processor is configured to execute the computer program so as to determine a time-domain transmission resource for a control channel within a mini-slot; and detect a time-domain transmission resource offset by M time-domain symbols relative to the time-domain transmission resource so as to acquire parts of or all of DMRS of a service channel within the mini-slot, M being an integer greater than or equal to 1;

wherein the processor is further configured to execute the computer program so as to acquire a mapping mode of the DMRS of the service channel; and detect the time-domain transmission resource offset by M time-domain symbols relative to the time-domain transmission resource corresponding to the control channel in accordance with the mapping mode, so as to acquire parts of or all of the DMRS of the service channel within the mini-slot;

wherein the processor is further configured to execute the computer program so as to acquire frequency-domain transmission resources occupied by the control channel and frequency-domain transmission resources occupied by the service channel from the time-domain transmission resources occupied by the control channel; and determine the mapping mode of the DMRS of the service channel in accordance with the frequency-domain transmission resources occupied by the control channel and the frequency-domain transmission resources occupied by the service channel;

wherein the processor is further configured to execute the computer program so as to determine, when a size of the frequency-domain transmission resource occupied by each of the control channel and the service channel is greater than or equal to a predetermined value, that parts of the DMRS of the service channel are to be mapped to the time-domain transmission resource offset by M time-domain symbols relative to the time-domain transmission resource corresponding to the control channel within the mini-slot, and determine, when the size of the frequency-domain transmission resource occupied by each of the control channel and the service channel is smaller than the predetermined value, that all of the DMRS of the service channel are to be mapped to the time-domain transmission resource offset by M time-domain symbols relative to the time-domain transmission resource corresponding to the control channel within the mini-slot.

17. The UE according to claim 16, wherein the service channel comprises a PUSCH or a PDSCH, and the control channel comprises a PUCCH or a PDCCH.

18. The UE according to claim 16, wherein the processor is further configured to execute the computer program so as to detect the time-domain transmission resource offset by M time-domain symbols relative to the time-domain transmission resource so as to acquire a first part of DMRS of the service channel within the mini-slot, wherein frequency-domain positions of frequency-domain transmission resources corresponding to the first part of DMRS overlap frequency-domain positions of frequency-domain transmission resources corresponding to the control channel.

19. The UE according to claim 16, wherein the processor is further configured to execute the computer program so as to detect transmission resources in the time-domain transmission resources corresponding to the control channel within the mini-slot and at frequency-domain positions different from the control channel so as to acquire a second part of DMRS of the service channel within the mini-slot, wherein frequency-domain positions of frequency-domain transmission resources corresponding to the second part of DMRS do not overlap the frequency-domain positions of the frequency-domain transmission resources corresponding to the control channel.

* * * * *